(12) United States Patent
Higuchi

(10) Patent No.: US 10,665,395 B2
(45) Date of Patent: May 26, 2020

(54) POWER STORAGE DEVICE

(71) Applicant: Murata Manufacturing Co., Ltd., Nagaokakyo-shi, Kyoto-fu (JP)

(72) Inventor: Masashi Higuchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 9 days.

(21) Appl. No.: 16/123,181

(22) Filed: Sep. 6, 2018

(65) Prior Publication Data

US 2019/0006123 A1    Jan. 3, 2019

Related U.S. Application Data

(63) Continuation of application No. PCT/JP2016/058037, filed on Mar. 14, 2016.

(51) Int. Cl.
*H01G 11/52* (2013.01)
*H01G 11/82* (2013.01)
(Continued)

(52) U.S. Cl.
CPC ............. *H01G 11/12* (2013.01); *H01G 11/28* (2013.01); *H01G 11/52* (2013.01); *H01G 11/78* (2013.01);
(Continued)

(58) Field of Classification Search
None
See application file for complete search history.

(56) References Cited

U.S. PATENT DOCUMENTS

| 7,781,093 B2* | 8/2010 | Jeung | H01M 2/1094 429/139 |
|---|---|---|---|
| 2007/0154790 A1* | 7/2007 | Jeung | H01M 2/1094 429/139 |

(Continued)

FOREIGN PATENT DOCUMENTS

| JP | H10326608 A | 12/1998 |
|---|---|---|
| JP | 2007103287 A | 4/2007 |

(Continued)

OTHER PUBLICATIONS

International Search Report issued for PCT/JP2016/058037, dated May 31, 2016.

(Continued)

*Primary Examiner* — Dion Ferguson
(74) *Attorney, Agent, or Firm* — Arent Fox LLP

(57) ABSTRACT

An electrode laminate is located in a case. The electrode laminate has opposed first and second principal surfaces and opposed first and second lateral side surfaces. The electrode laminate includes a positive electrode having a planar main surface and first and second opposed lateral ends located on opposite lateral sides of its main surface, a negative electrode having a planar main surface and first and second opposed lateral ends located on opposite lateral sides of its main surface, the main surface of the positive electrode opposing the main surface of the negative electrode. A separator is located between the opposed main surfaces of the positive and negative electrodes and has first and second lateral ends extending laterally outward from the first and second lateral ends of the positive and negative electrodes, respectively. At least a tip of the first and second lateral ends of the separator are bent in a direction towards the first principal surface of the electrode laminate. An electrolyte is impregnated in the separator.

18 Claims, 3 Drawing Sheets

(51) Int. Cl.
    *H01G 11/12* (2013.01)
    *H01M 2/02* (2006.01)
    *H01M 2/16* (2006.01)
    *H01M 10/04* (2006.01)
    *H01G 11/28* (2013.01)
    *H01G 11/78* (2013.01)
    *H01M 4/70* (2006.01)
    *H01M 2/18* (2006.01)
    *H01M 10/0585* (2010.01)
    *H01M 10/42* (2006.01)

(52) U.S. Cl.
    CPC .......... *H01G 11/82* (2013.01); *H01M 2/0217* (2013.01); *H01M 2/0275* (2013.01); *H01M 2/0287* (2013.01); *H01M 2/1673* (2013.01); *H01M 4/70* (2013.01); *H01M 10/0436* (2013.01); *H01M 2/18* (2013.01); *H01M 10/0585* (2013.01); *H01M 10/4235* (2013.01)

(56) References Cited

U.S. PATENT DOCUMENTS

| | | | |
|---|---|---|---|
| 2008/0305398 A1 | 12/2008 | Komiya | |
| 2011/0176255 A1* | 7/2011 | Sasaki | H01G 9/016 361/502 |
| 2012/0092808 A1* | 4/2012 | Kim | H01G 11/12 361/502 |
| 2012/0115025 A1 | 5/2012 | Kim et al. | |
| 2012/0328944 A1* | 12/2012 | Tsukagoshi | H01M 4/137 429/213 |
| 2013/0157110 A1* | 6/2013 | Kanai | H01M 2/266 429/153 |
| 2014/0004420 A1* | 1/2014 | Hatanaka | H01M 4/131 429/211 |
| 2015/0147640 A1 | 5/2015 | Kim et al. | |
| 2015/0295244 A1* | 10/2015 | Otsuka | H01G 11/30 429/213 |
| 2018/0337395 A1* | 11/2018 | Matsui | H01M 4/134 |
| 2018/0375066 A1* | 12/2018 | Shibata | H01G 11/82 |
| 2019/0080855 A1* | 3/2019 | Kenko | H01M 2/0202 |
| 2019/0081286 A1* | 3/2019 | Otsuka | H01M 2/0285 |
| 2019/0097181 A1* | 3/2019 | Otsuka | H01G 11/78 |

FOREIGN PATENT DOCUMENTS

| | | |
|---|---|---|
| JP | 2008204706 A | 9/2008 |
| JP | 2012529753 A | 11/2012 |
| JP | 2013206699 A | 10/2013 |
| JP | 2014078389 A | 5/2014 |
| JP | 2015146252 A | 8/2015 |

OTHER PUBLICATIONS

Written Opinion of the International Searching Authority issued for PCT/JP2016/058037, dated May 31, 2016.

* cited by examiner

POWER STORAGE DEVICE

CROSS REFERENCE TO RELATED APPLICATIONS

The present application is a continuation of International Application No. PCT/JP2016/058037, filed Mar. 14, 2016, the entire contents of each of which are incorporated herein by reference.

TECHNICAL FIELD

The present invention relates to a power storage device.

BACKGROUND ART

Conventionally, power storage devices are used as a power source in various kinds of electronic equipment. For example, Japanese Patent Application Laid-Open No. 2015-146252 (Patent Document 1) discloses a power storage device having an electrode laminate in which a positive electrode, a separator and a negative electrode are laminated together. In this power storage device, the positive electrode is smaller than the negative electrode and the separator is larger than the negative electrode so as to prevent a short circuit between the positive and negative electrodes.

In recent years, electronic equipment has been increasingly miniaturized and thus the need for thinner and smaller power storage devices has increased. A main object of the present invention is to provide a power storage device which is thin and small.

BRIEF DESCRIPTION OF THE INVENTION

In accordance with at least one embodiment of the invention, a power storage device includes a case and an electrode laminate located in the case. The electrode laminate has opposed first and second principal surfaces and opposed first and second lateral side surfaces each of which extend between the first and second principal surfaces. The electrode laminate includes one or more positive/negative electrode pairs each of which includes a positive electrode having a planar main surface and first and second opposed lateral ends located on opposite lateral sides of its main surface, a negative electrode having a planar main surface and first and second opposed lateral ends located on opposite lateral sides of its main surface, the main surface of the positive electrode opposing the main surface of the negative electrode, and a separator located between the opposed main surfaces of the positive and negative electrodes. The separator has first and second lateral ends extending laterally outward from the first and second lateral ends of the positive and negative electrodes, respectively. At least a tip of the first and second lateral ends of the separator are bent in a direction towards the first principal surface of the electrode laminate. An electrolyte is impregnated in the separator.

In an embodiment, one or more tapes hold the tips of the first and second ends such that they are each bent in the direction toward the first principal surface of the electrode laminate. In some embodiments, the one or more tapes comprise first and second tapes. The first tape preferably extends from the first principal surface of the electrode laminate across the first lateral side surface of the electrode laminate and onto the second principal surface of the electrode laminate. The second tape preferably extends from the first principal surface of the electrode laminate across the second lateral side surface of the electrode laminate and onto the second principal surface of the electrode laminate.

In other embodiments, the one or more tapes comprise a single tape which extends from the first principal surface of the electrode laminate, across the first lateral side surface of the electrode laminate, across the second principal surface of the electrode laminate, across the second lateral side surface of the electrode laminate and onto the first principal surface of the electrode laminate.

In yet other embodiments, the one or more tapes comprise a single tape which extends across the first principal surface of the electrode laminate from the first to the second lateral side surface, across the first lateral side surface of the electrode laminate from the first to the second main surfaces of the electrode laminate, across the second principal surface of the electrode laminate from the first to the second lateral side surfaces, across the second lateral side surface of the electrode laminate from the first to the second main surfaces and across the first principal surface of the electrode laminate from the first to the second lateral side surfaces.

In some embodiments the one or more tapes include at least one tape that is a double-sided adhesive bonding tape which bonds the electrode laminate to the case.

In some embodiments at least the tips of the first and second lateral ends of at least some of the separators extend above the first principal surface of the electrode laminate to form a central recess and a bonding layer is located in the central recess and couples the electrode laminate to the case. In some embodiments, some of the tips of the first and second lateral ends of the separators extend above the first principal surface of the electrode laminate and others do not.

In some embodiments, the first ends of each adjacent separator contact each other and the second ends of each adjacent separator contact each other.

According to the present invention, a power storage device can be provided which is thin and small.

BRIEF EXPLANATION OF DRAWINGS

FIG. 6 is a schematic cross-sectional view of a power storage device according to a modification of the first exemplary embodiment.

DETAILED DESCRIPTION OF THE PREFERRED EMBODIMENTS

Figure 1:
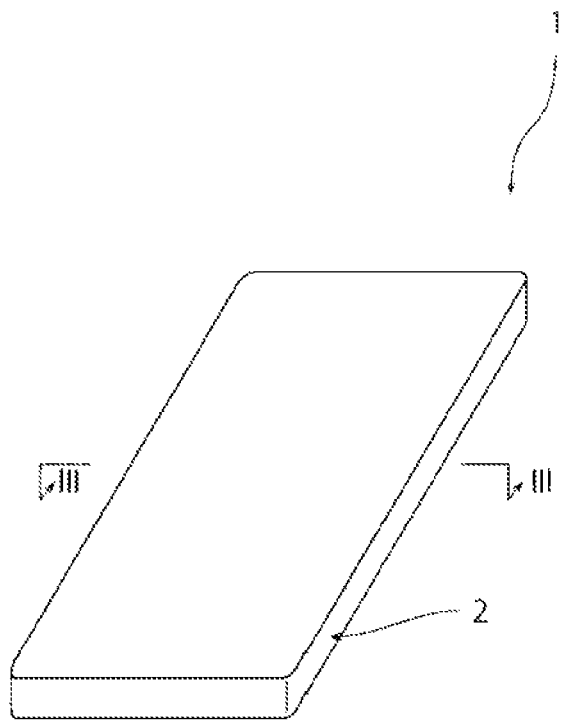
FIG. 1 is a schematic perspective view of a power storage device according to a first exemplary embodiment of the invention.

Examples of several exemplary embodiments in the practice of the present invention will be described below. However, the following embodiments are provided merely by way of example. The present invention is not limited to the following embodiments in any way.

Furthermore, members that have a substantially identical function shall be denoted by an identical reference symbol in the respective drawings referenced in the embodiment and the like. In addition, the drawings referenced in the embodiment and the like are shown schematically. The dimensional ratios and the like of the objects drawn in the drawings may different from the dimensional ratios and the like of real objects. The dimensional ratios and the like of the objects may be also different between the drawings. The dimensional ratios and the like of specific objects should be determined in view of the following description.

First Exemplary Embodiment

Figure 2:
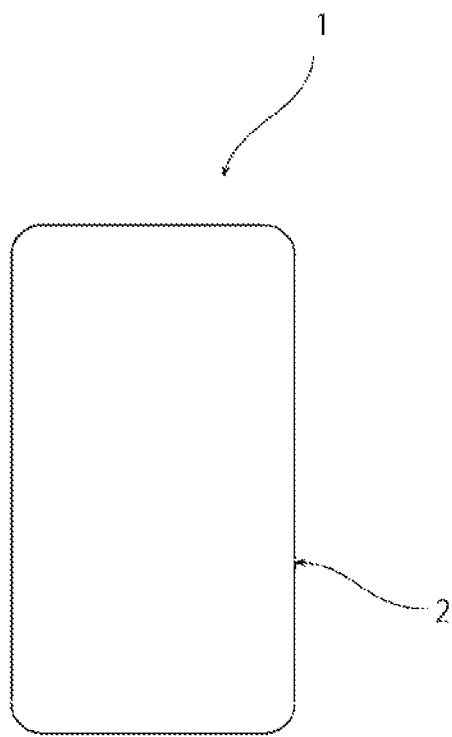
FIG. 2 is a schematic plan view of the power storage device according to the first exemplary embodiment.
Figure 3:
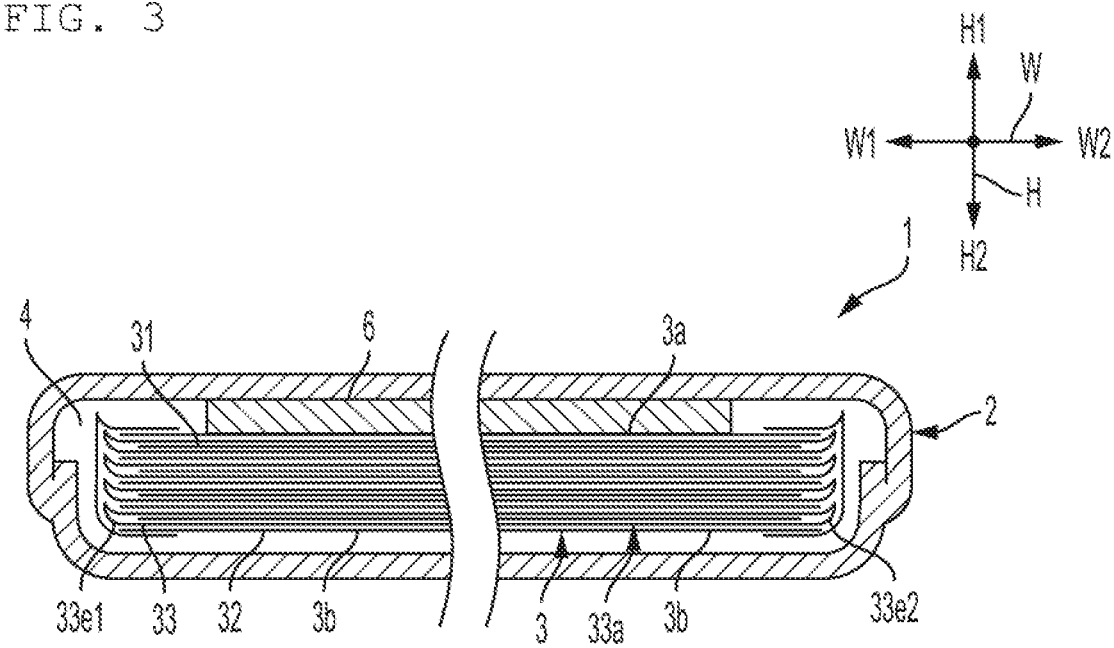
FIG. 3 is a schematic cross-sectional view taken along line III-III of FIG. 1.

A power storage device 1 shown in FIGS. 1 to 3 includes an electrolyte 4. The power storage device 1 may be, for example, a battery such as a secondary battery, a capacitor such as an electrical double layer capacitor, or the like.

As shown in FIG. 3, the power storage device 1 includes a case 2 having a substantially rectangular parallelepiped shape. The corners of the case 2 are preferably rounded in plan view as shown in FIG. 2. The case 2 is preferably formed of a material which reacts minimally with the electrolyte 4. The case 2 may take several forms. For example, be formed of an insulator or an electrical conductor. The case 2 may be formed of an electrical conductor with its inner surface being coated with an insulating coating film. The case 2 may be formed of a laminate film having a laminated structure of an insulator and an electrical conductor.

Though not shown in FIG. 1, one or more electrode terminals may be provided in the case 2. For example, both a positive terminal and a negative terminal may be provided in the case 2 or one terminal may be provided on the case 2 and the case itself can provide the other terminal, for example when the case 2 that is formed of an electrical conductor.

As shown in FIG. 3, an electrode laminate 3 is located inside the case 2. The electrode laminate has a height measured along then H axis shown in the figure and a width measured along the W axis shown in the figure. The electrode laminate 3 has upper and lower principal surfaces 3a and 3b and left and right lateral surfaces extending between the upper and lower principal surfaces 3a and 3b.

The electrode laminate 3 has a plurality of positive electrodes 31, a plurality of negative electrodes 32, and a plurality of separators 33.

Each of the positive and negative electrodes 31 and 32 have a generally planar shape with a pair of planar main surfaces which extend parallel to the principal surfaces 3a, 3b of the electrode laminate 3. In the present embodiment, the electrodes 31 and 32 are rectangular in shape. However, the positive and negative electrodes 31 and 32 may have any shape as long as they have a pair of opposite main surfaces.

Respective pairs of positive and negative electrodes 31 and 32 oppose each other with a respective separator 33 interposed there between so as to insulate the associated pair of positive and negative electrodes 31 and 32. In the preferred embodiment, the lateral ends of the separators 33 which are adjacent to each other with the positive electrode 31 interposed there between are connected to each other to form a bag-shaped separator 33a. A respective positive electrode 31 is located in each of the bag-shaped separators 33a.

The structure of the positive electrodes 31 can be appropriately determined depending on the kind of the power storage device 1. For example, when the power storage device 1 is a secondary battery, the positive electrodes 31 can be constituted by a positive collector and an active material layer provided on at least one surface of the positive collector. For example, when the power storage device 1 is an electrical double layer capacitor, the positive electrodes 31 can be constituted by a positive collector and a polarizable electrode layer provided on at least one surface of the positive collector.

The structure of the negative electrodes 32 can similarly be appropriately determined depending on the kind of the power storage device 1. For example, when the power storage device 1 is a secondary battery, the negative electrodes 32 can be constituted by a negative collector and an active material layer provided on at least one surface of the negative collector. For example, when the power storage device 1 is an electrical double layer capacitor, the negative electrodes 32 can be constituted by a negative collector and a polarizable electrode layer provided on at least one surface of the negative collector.

The separators 33 can be constituted by, for example, a porous sheet having continuous pores which allow ions in an electrolyte to move there through. The separators 33 may be constituted by, for example, polypropylene, polyethylene, polyimide, cellulose, aramid, polyvinylidene fluoride, Teflon (registered trademark) or the like. Further, a surface of the separators 33 may be covered with a ceramic coat layer, a bonding layer, or the like. The surface of the separators 33 may have bonding properties. The separators 33 may be a single layer film made of one material or may be a composite film or a multiple layer film made of one kind or two or more kinds of materials.

The separators 33 are not necessarily bag-shaped. They may have a sheet-like form with each respective sheet being located between a respective pair of positive and negative electrodes 31 and 32. Each separators 33 may, for example, be fixed to the surface of either its associated positive electrode 31 or its associated negative electrode 32. The separator 33 may have a zigzag-folded form in which the separators 33 may be formed of a single continuous separator which zig zags back and forth through the electrode laminate 3 so that a respective section of the single separator passes between each of the positive/negative electrode pairs.

In the power storage device 1, the positive electrodes 31, the separators 33, and the negative electrodes 32 are laminated in this order a plurality of times. That is, a first set of positive electrode, separator and negative electrode is followed by a second set of positive electrode, separator and negative electrode (in the stacking direction), etc. The electrolyte 4 is preferably impregnated in the separators 33.

In the power storage device, each respective pair of positive and negative electrode is preferably insulated by a respective separator. To do so, it is preferable to provide each separator with a larger area than the area of its associated positive and negative electrodes. However, if there is any portion of the electrode pair where the positive electrode does not oppose the negative electrode, such portions do not contribute to charging and discharging and the presence of a separator in this region will cause the energy density and efficiency relative to the size of the power storage device tend to decrease. Therefor the separator is preferably absent in this region.

Each of the separators 33 has a main surface which preferably runs parallel to the main surfaces of the associated positive and negative electrodes. First and second lateral ends 33e1 and 33e2 of the main surface extend laterally (i.e., along the W1 and W2 directions, respectively) beyond the side surfaces of its associated positive and negative electrodes. At least the tip of each of the first and second lateral ends 33e1 and 33e2 are each bent upwardly (as viewed in FIG. 3). Alternatively, they could all be bent downwardly. More generally, they are all bent toward one side (e.g., the H1 or the H2 side) in the laminating or height direction H. As a result the overall width of the electrode laminate 3 (as viewed in FIG. 3) is less than it would be if the tips of the first and second lateral ends 33e1 and 33e2 were not bent upwardly or downwardly. This means that the width of the positive and negative electrodes, and the amount of their overlapping area, can be greater for a given width of the case 2. This increases the energy density of the power storage device. Therefore, the power storage device 1 has high energy density and efficiency and the power storage device 1 can be miniaturized.

The first and second ends 33e1 and 33e2 of the separators 33 preferably extend at least 0.1 mm beyond lateral edges of their associated positive and negative electrodes 31 and 32 in order to secure insulation between the associated pair of positive and negative electrodes. Preferably, the first and second ends 33e1 and 33e2 extend 2.0 mm beyond the lateral edges of their associated positive and negative electrodes 31 and 32 because bending of these ends increases their dimensions in the height direction H of the electrode laminate. As used herein, the term "bending" includes "curving".

In order to increase the area of the overlapping portions of the positive/negative electrode pairs (for a case of a given width), one could bend the first end 33e1 of the separators upwardly and the second end 33e2 downwardly. However, because at least some portions of the ends of the separators will extend both above and below the principle upper and lower surfaces 3a, 3b of the electrode laminate 3, there will be space both above and below the electrode laminate where there are no positive and/or negative electrodes. Thus, for a case 2 of a given height, the number of positive/negative electrode pairs which can be accommodated in the case (i.e., stacked in the stacking or height direction H) will be decreased. Therefore, it is difficult to make the power storage device thinner.

In order to avoid this problem, the tips of the first and second ends 33e1 and 33e2 are all bent upwardly (or, alternatively, downwardly) in the same direction. That is, since at least the tips of the first and second ends 33e1, 33e2 are each bent in the same direction, the power storage device 1 is thin and small.

Any method can be used to hold the tips of the first and second ends 33e1 and 33e2 in the bent state. For example, in the present embodiment, a pair of tapes 51 and 52 are used to hold at least the tips of the first and second ends 33e1, 33e2, respectively, in the bent state.

Each of the tapes 51 and 52 can be formed of, for example, a resin tape such as polyimide, polypropylene, and acrylic; the same porous sheet as used for the separator, or a metal foil such as an aluminum foil, a copper foil, a stainless foil, and a nickel foil. When the tapes 51 and 52 are formed of a metal foil and are in directly contact with at least one of the positive and negative electrodes 31, 32, they are preferably formed of an insulator or a member coated with an insulating layer.

The first tape 51 is provided on the left side (the W1 side) of the electrode laminate 3 and extends from a portion of the first principal surface 3a to a portion of the second principal surface 3b of the electrode laminate 3 via one lateral side (the left or W1 side) surface of the electrode laminate 3. The first tape 51 preferably contacts at least the tip of each of the first ends 33e1 of the separators 33 and holds those ends so that they are bent upwardly in the laminating or height direction H.

The second tape 52 is provided on the right side (the W2 side) of the electrode laminate 3 and extends from a portion of the first principal surface 3a to a portion of the second principal surface 3b of the electrode laminate 3 via the opposite lateral side (the right or W2 side) surface of the electrode laminate 3. The second tape 51 preferably contacts at least the tip of each of the second ends 33e2 of the separators 33 and holds those ends so that they are bent upwardly in the laminating or height direction H.

The method of connecting the tapes 51, 52 to the electrode laminate 3 is not particularly limited. For example, the tapes 51, 52 may be directly connected to the electrode laminate 3, or may be connected by adhesively bonding to the electrode laminate 3 using an adhesive bonding agent. Another adhesive bonding tape may be used to fix the tapes 51, 52 to the electrode laminate 3. The tapes 51, 52 may be formed of an adhesive bonding tape to thereby bond the tapes 51, 52 to the electrode laminate 3. The tapes 51, 52 may be formed of a double-sided adhesive bonding tape to thereby bond the tapes 51, 52 to the electrode laminate 3, and also to fix the electrode laminate 3 and the case 2 by bonding with the tapes 51, 52. This effectively suppresses displacement of the electrode laminate 3 in the case 2. Alternatively, adhesive bonding tapes separate from the tapes 51, 52 may be used to fix the tapes 51, 52 and the electrode laminate 3.

The term "adhesively bond" as used herein includes "adhere" and "bond". Thus, the adhesive bonding agent includes an adhesive material and a bonding agent. The adhesive bonding tape includes an adhesive tape and a bonding tape.

From the viewpoint of further miniaturizing the power storage device 1 (and increasing energy density), it is preferable that the first ends 33e1 of adjacent separators 33 (adjacent in the laminating or height direction H) be in contact with and connected to each other and that the second ends 33e2 of adjacent separators 33 (adjacent in the laminating or height direction H) be in contact with and connected to each other.

In the present embodiment, it is further preferable that ends of the bag-shaped separators 33a which are adjacent to one another in the height or laminating direction H be in contact with each other and that the other ends thereof be in contact with each other. It is further preferable that ends of the bag-shaped separators 33a which are adjacent to one another in the laminating or height direction H be connected to each other and that the other ends thereof be connected to each other.

The method of connecting the separators 33 to each other is not particularly limited. The separators 33 can be connected to each other, for example, by heat welding, bonding using a bonding agent, or the like.

The tapes 51, 52 may be adhesively bonded to at least a part of the electrode laminate 3. Specifically, in the present embodiment, the first tape 51 may be adhesively bonded to the first ends 33e1 of the separators 33, while the second tape 52 may be adhesively bonded to the second ends 33e2 of the separators 33.

In the present embodiment, an example in which the adjacent separators 33 having a positive electrode 31 interposed there between form the bag-shaped separator 33a has been described. However, the present invention is not limited to this configuration.

To maintain insulation between the positive/negative electrode pairs, at least one of the positive and negative electrodes 31, 32 may be smaller than the separator 33. It is preferable that both the positive and negative electrodes 31, 32 be smaller than the separator 33 in order to accommodate any lamination misalignment or the like. When the positive electrode 31 is inserted in the bag-shaped separator 33a, as in the present embodiment, it is preferable that the positive electrode 31 be smaller than the negative electrode 32 and the negative electrode 32 be smaller than the separator 33. In order to maximize the power storage characteristics of the power storage device 1, the negative electrode 32 preferably has a size which does not allow bending along the first and second ends 33e1, 33e2. In order to maximize the opposed areas of the positive electrode 31 and the negative electrode 32, and thereby increase energy density, the positive and negative electrodes 31, 32 may be sized to bend along the first and second ends 33e1, 33e2.

As described above, in the present embodiment, the first and second ends 33e1, 33e2 of the separators 33 are all bent upwardly (more generally, they are all bent in the same upward or downward direction). This decreases the wasted space (i.e., the space where there are no overlapping positive and negative electrodes) on either lateral side of the case 2 and thereby enables increased energy density. However, the top of at least some of the first and second ends 33e1, 33e2 of the separators 33 protrude above the top principal surface 3a of the electrode laminate 3. The presence of these portions of the separators reduce the space at the top of the case where positive and negative electrodes can be placed. However, this is preferable to the situation where the first ends 33e1 extend upwardly and the second ends 33e2 extend downwardly (or vice versa). In such a case, there is lost space for positive and negative electrodes on both the top and bottom of the case. By ensuring that both the first and second ends 33e1 and 33e2 extend in the same direction (i.e., either upwardly or downwardly as shown in FIG. 3), space is lost only on the top or bottom of the case and an increased energy density is possible.

The combination of those portions of the upper ends of the first and second ends 33e1 and 33e2 which extend above the upper principal surface 3a of the electrode laminate and the portions of the tapes 51 and 52 which extend onto the upper principal surface 3a of the electrode laminate form a recess surrounding a central portion (central in the width direction W) of the upper main surface 3a. In order to reduce the height of the electric storage device 1, a bonding layer 6 is provided in the recess in order to bond the electrode laminate 3 to the case 2. If, as noted above, the first and second ends 33e1 and 33e2 are bent downwardly instead of upwardly, the recess would be situated on the bottom of the electrode laminate 3. In this case, it is preferable that the bonding layer 6 be attached to the central portion of the lower main surface 3b of the electrode laminate. In the described embodiment the tapes 51 and 52 do not extend into the central portion of the upper main surface of the electrode laminate where the bonding layer 6 is located. However, if desired, the tapes can extend into this area.

Another example of a preferred embodiment of the present invention will be described below. In the following description, members having substantially the same functions as those of the first embodiment will be referred to using the same symbols and a description thereof will be omitted.

Second Embodiment

Figure 4:
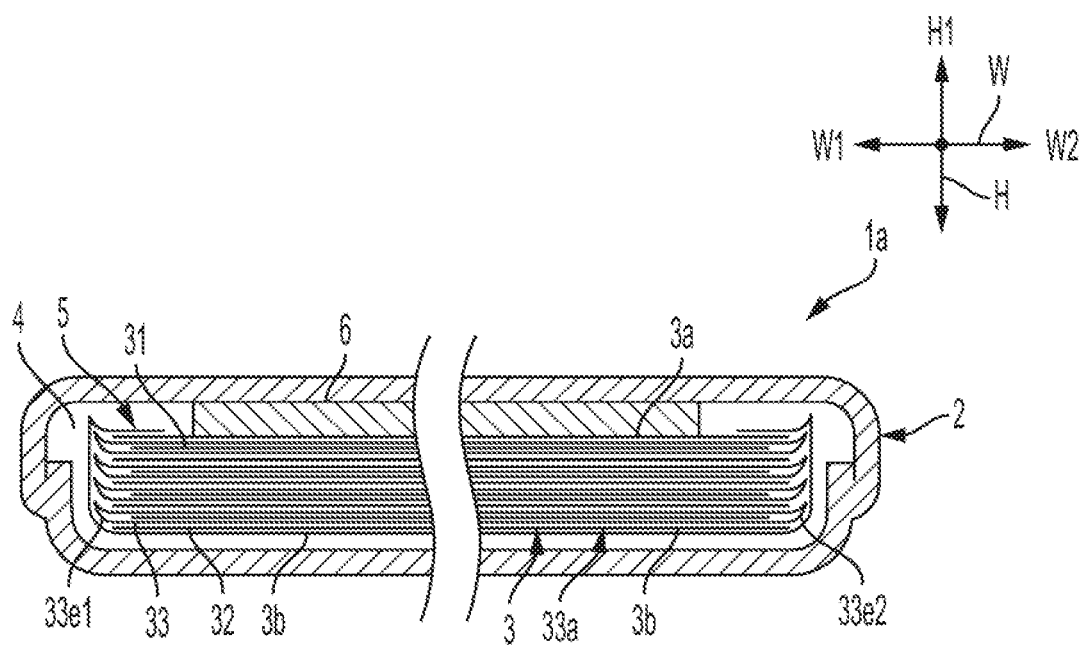
FIG. 4 is a schematic cross-sectional view of a power storage device according to a second exemplary embodiment of the invention.

FIG. 4 is a schematic cross-sectional view of the power storage device 1a according to a second embodiment of the invention.

In the first embodiment, first and second tapes 51 and are used. However, the present invention is not limited to this configuration. In the present invention, a single tape performing the functions of both tapes 51 and 52 can be used. For example, the first tape 51 and the second tape 52 may be connected on the second principal surface 3b of the electrode laminate 3 (stated otherwise, a single tape can extend laterally across part of the left top principal surface 3a of the electrode laminate 3, downwardly across the left lateral side surface of the electrode laminate 3, laterally across the bottom principal surface 3b of the electrode laminate 3, upwardly across the right lateral side surface of the electrode laminate 3 and laterally across part of the right upper principal surface of the electrode laminate 3). In this case, the number of parts constituting the power storage device 1a can be reduced. In addition, the tape 5 can be firmly fixed to the electrode laminate 3.

Third Embodiment

Figure 5:
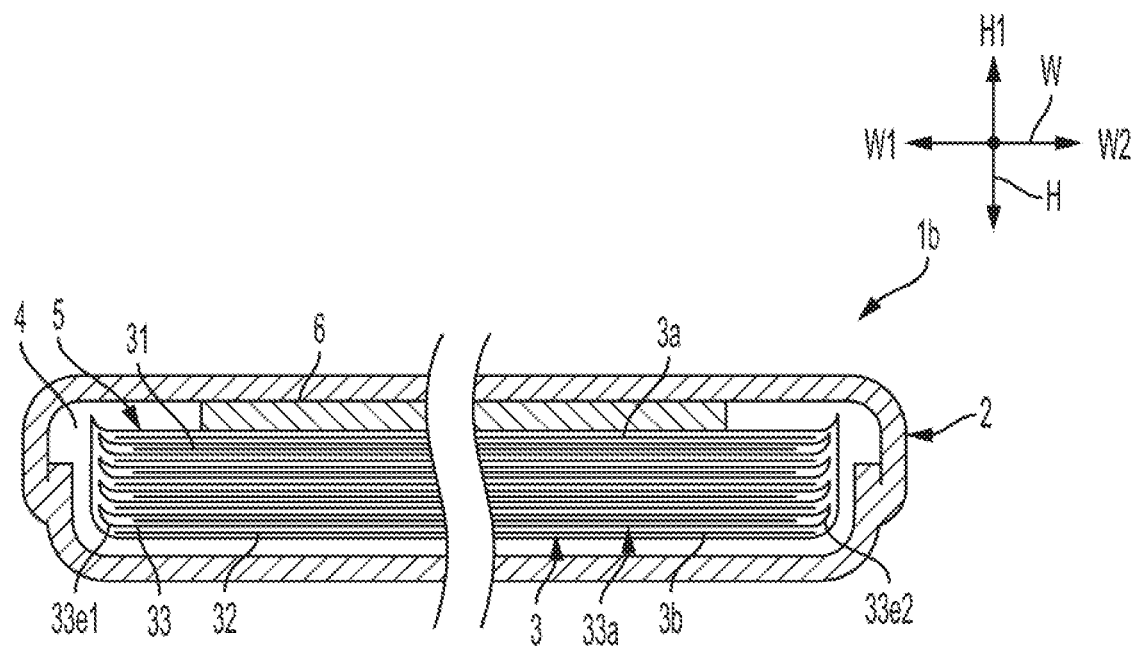
FIG. 5 is a schematic cross-sectional view of a power storage device according to a third exemplary embodiment of the invention.

FIG. 5 is a schematic cross-sectional view of the power storage device 1b according to a third embodiment.

As shown in FIG. 5, the tape 5 may be wound around the entire circumference of the electrode laminate 3. That is, in addition to extending over the areas described with respect to the embodiment of second embodiment, it extends over the entire length of the upper principal surface 3a of the electrode laminate (and under the bonding layer 6). With this structure the first and second ends 33e1, 33e2 can be suitably held in the bent state.

DESCRIPTION OF REFERENCE SYMBOLS

1: 1a, 1b Power storage device
2: Case
3: Electrode laminate
3a: First principal surface of electrode laminate
3b: Second principal surface of electrode laminate
4: Electrolyte
5: Tape
6: Bonding layer
31: Positive electrode
32: Negative electrode
33: Separator
34: Separator
33a: Bag-shaped separator
33e1: First end
34e1: First end
33e2: Second end
34e2: Second end
51: First tape
52: Second tape

The invention claimed is:

1. A power storage device comprising:
(a) a case;
(b) an electrode laminate located in the case, the electrode laminate having opposed first and second principal surfaces and opposed first and second lateral side surfaces each of which. extend between the first and second principal surfaces, the electrode laminate comprising:
  (i) a positive electrode having a planar main surface and first and second opposed lateral ends located on opposite lateral sides of its main surface;
  (ii) a negative electrode having a planar main surface and first and second opposed lateral ends located on opposite lateral sides of its main surface, the main surface of the positive electrode opposing the main surface of the negative electrode;

(iii) a separator located between the opposed main surfaces of the positive and negative electrodes, the separator having first and. second lateral ends extending laterally outward from the first and second. lateral ends of the positive and negative electrodes, respectively, at least a tip of the first and second lateral ends of the separator being bent in a direction towards the first principal surface of the electrode laminate; and (iv) an electrolyte impregnated in the separator, wherein:

at least the tips of the first and second lateral ends of at least some of the separators extend above the first principal surface of the electrode laminate to form a central recess and a bonding layer located in the central recess and coupling the electrode laminate to the ease.

2. The power storage device according to claim 1, further comprising one or more tapes holding the tips of the first and second ends such that they are each bent in the direction toward the first principal surface of the electrode laminate.

3. The power storage device according to claim 2, wherein the one or more tapes comprise first and second tapes.

4. The power storage device according to claim 3, wherein:

the first tape extends from the first principal surface of the electrode laminate across the first lateral side surface of the electrode laminate and onto the second principal surface of the electrode laminate; and the second tape extends from the first principal surface of the electrode laminate across the second lateral side surface of the electrode laminate and onto the second principal surface of the electrode laminate.

5. The power storage device according to claim 2, wherein the one or more tapes comprise a single tape which extends from the first principal surface of the electrode laminate, across the first lateral side surface of the electrode laminate, across the second principal surface of the electrode laminate, across the second lateral side surface of the electrode laminate and onto the first principal surface of the electrode laminate.

6. The power storage device according to claim 2, wherein the one or more tapes comprise a single tape which extends across the first principal. surface of the electrode laminate from the first to the second lateral side surface, across the first lateral side surface of the electrode laminate from the first to the second main surfaces of the electrode laminate, across the second principal surface of the electrode laminate from the first to the second lateral side surfaces, across the second lateral side surface of the electrode laminate from the first to the second main surfaces and across the first principal surface of the electrode laminate from the first to the second lateral side surfaces.

7. The power storage device according, to claim 2, wherein the one or more tapes include at least one tape that is a double sided adhesive bonding tape which bonds the electrode laminate to the case.

8. The power storage device according to claim 7, wherein some of the tips of the first and second lateral ends of the separators extend above the first principal surface of the electrode laminate and others do not.

9. The power storage device according to claim 1, wherein the first ends of each adjacent separator contact each other and the second ends of each adjacent separator contact each other.

10. A power storage device comprising:

(a) a case:

(b) an electrode laminate located in the case, the electrode laminate having opposed first and second principal surfaces and opposed first and second lateral side surfaces each of which extend between the first and second principal surfaces, the electrode laminate comprising a plurality of positive/negative electrode pairs, each electrode pair comprising:

(i) a positive electrode having a planar main surface and first and. second. opposed lateral ends located on opposite lateral sides of its main surface;

(ii) a negative electrode having a planar main surface and first and second opposed lateral. ends located on opposite lateral sides of its main surface, the main surface of the positive electrode opposing the main surface of the negative electrode;

(iii) a separator located between the opposed main surfaces of the positive and negative electrodes, the separator having first and second lateral ends extending laterally outward from the first and second lateral ends of the positive and negative electrodes, respectively, at least a tip of the first and second lateral ends of the separator being bent in a direction towards the first principal surface of the electrode laminate; and (iv) an electrolyte impregnated in the separator, wherein:

at least the tips of the first and second lateral ends of at least some of the separators extend above the first principal surface of the electrode laminate to form. a central recess and a bonding layer located in the central recess and coupling the electrode laminate to the case.

11. The power storage device according to claim 9, further comprising one or more tapes holding the tips of the first and second ends such that the tips of the first and second ends are each bent in the direction toward the first principal surface of the electrode laminate.

12. The power storage device according to claim 11, wherein the one or more tapes comprise first and second tapes.

13. The power storage device according to claim 12, wherein:

the first tape extends from the first principal surface of the electrode laminate across the first lateral side surface of the electrode laminate and onto the second principal surface of the electrode laminate; and.

the second tape extends from the first principal surface of the electrode laminate across the second lateral side surface of the electrode laminate and onto the second principal surface of the electrode laminate.

14. The power storage device according to claim 11, wherein the one or more tapes comprise a single tape which extends from the first principal surface of the electrode laminate, across the first lateral side surface of the electrode laminate, across the second principal surface of the electrode laminate, across the second lateral side surface of the electrode laminate and onto the first principal surface of the electrode laminate.

15. The power storage device according to claim 11, wherein the one or more tapes comprise a single tape which extends across the first principal surface of the electrode laminate from the first to the second lateral side surface, across the first lateral side surface of the electrode laminate from the first to the second main surfaces of the electrode laminate, across the second principal surface of the electrode laminate from the first to the second lateral side surfaces, across the second lateral side surface of the electrode laminate from the first to the second main surfaces and across the first principal surface of the electrode laminate from the first to the second lateral side surfaces.

16. The power storage device according to claim 11, wherein the one or more tapes include at least one tape that is a double-sided adhesive bonding tape which bonds the electrode laminate to the case.

17. The power storage device according to claim 16, wherein some of the tips of the first and second lateral ends of the separators extend above the first principal surface of the electrode laminate and others do not.

18. The power storage device according to claim 10, wherein the first ends of each adjacent separator contact each other and the second ends of each adjacent separator contact each other.

* * * * *